US010841236B1

(12) United States Patent
Jin et al.

(10) Patent No.: US 10,841,236 B1
(45) Date of Patent: Nov. 17, 2020

(54) DISTRIBUTED COMPUTER TASK MANAGEMENT OF INTERRELATED NETWORK COMPUTING TASKS

(71) Applicant: Electronic Arts Inc., Redwood City, CA (US)

(72) Inventors: Yu Jin, Fremont, CA (US); Sundeep Narravula, Saratoga, CA (US); Navid Aghdaie, San Jose, CA (US); Kazi Atif-Uz Zaman, Foster City, CA (US); Preethi Ganeshan, San Carlos, CA (US); Tushar Agarwal, San Carlos, CA (US); Cong Feng, San Jose, CA (US); Drew John Zagieboylo, Ithaca, NY (US)

(73) Assignee: Electronic Arts Inc., Redwood City, CA (US)

( * ) Notice: Subject to any disclaimer, the term of this patent is extended or adjusted under 35 U.S.C. 154(b) by 108 days.

(21) Appl. No.: 15/941,654

(22) Filed: Mar. 30, 2018

(51) Int. Cl.
| | | |
|---|---|---|
| *H04L 12/911* | (2013.01) | |
| *H04L 12/24* | (2006.01) | |
| *H04L 29/08* | (2006.01) | |
| *G06F 9/50* | (2006.01) | |
| *G06N 20/00* | (2019.01) | |

(Continued)

(52) U.S. Cl.
CPC ............ *H04L 47/70* (2013.01); *G06F 9/5005* (2013.01); *G06F 9/5072* (2013.01); *G06F 9/5077* (2013.01); *G06N 20/00* (2019.01); *G06N 20/10* (2019.01); *G06N 20/20* (2019.01); *H04L 41/12* (2013.01); *H04L 67/10* (2013.01)

(58) Field of Classification Search
CPC ........ G06F 9/50; G06F 9/5005; G06F 9/5061; G06F 9/5072; G06F 9/5077; G06N 20/00; G06N 20/10; G06N 20/20; H04L 47/70; H04L 67/10
See application file for complete search history.

(56) References Cited

U.S. PATENT DOCUMENTS

| 6,847,970 B2 * | 1/2005 | Keller ................... G06F 11/008 |
| 7,174,540 B2 * | 2/2007 | Ondrusek ................ G06F 8/71 |
| | | 717/120 |

(Continued)

*Primary Examiner* — George C Neurauter, Jr.
(74) *Attorney, Agent, or Firm* — Knobbe, Martens, Olson & Bear, LLP

(57) ABSTRACT

A system can manage distribution of computing jobs among a plurality of third-party network or cloud computing providers to maximize utilization of available computing resources purchased or otherwise obtained by an entity. The system can determine a dependency relationship between jobs and distribute the jobs among the network computing providers based at least in part on the dependency relationship between the jobs. Moreover, the system can use machine learning algorithms to generate one or more prediction algorithms to predict future computing resource usage demands for performing a set of scheduled and unscheduled jobs. Based at least in part on the resource prediction, the dependency relationship between jobs, service level agreements with network computing service providers, and job resource requirements, the system can determine an improved or optimal distribution of jobs among the network computing service providers that satisfies or best satisfies one or more objective functions to maximize resource utilization.

20 Claims, 7 Drawing Sheets

(51) Int. Cl.
*G06N 20/20* (2019.01)
*G06N 20/10* (2019.01)

(56) References Cited

U.S. PATENT DOCUMENTS

| | | | | |
|---|---|---|---|---|
| 7,257,635 B2 * | 8/2007 | Chellis | ............... | G06F 9/50 709/226 |
| 7,933,794 B2 * | 4/2011 | Adi | ............... | G06Q 10/06 705/7.11 |
| 8,122,446 B2 * | 2/2012 | Moore | ............... | G06F 8/61 717/174 |
| 8,175,863 B1 * | 5/2012 | Ostermeyer | ............... | G06F 17/5009 703/13 |
| 8,423,646 B2 * | 4/2013 | Jamjoom | ............... | G06F 9/5077 709/203 |
| 8,464,208 B2 * | 6/2013 | Feigen | ............... | G06F 8/24 717/104 |
| 8,782,098 B2 * | 7/2014 | Prabu | ............... | G06F 8/61 707/804 |
| 8,893,156 B2 * | 11/2014 | Coelho | ............... | G06F 11/3433 718/102 |
| 9,397,896 B2 * | 7/2016 | Billore | ............... | H04L 41/145 |
| 9,521,043 B2 * | 12/2016 | Billore | ............... | H04L 41/145 |
| 9,557,879 B1 * | 1/2017 | Wang | ............... | G06F 3/0481 |
| 9,851,989 B2 * | 12/2017 | Muller | ............... | G06F 9/5022 |
| 9,967,318 B2 * | 5/2018 | Fu | ............... | H04L 67/10 |
| 10,187,260 B1 * | 1/2019 | Chen | ............... | H04L 41/12 |
| 10,200,252 B1 * | 2/2019 | Qin | ............... | H04L 41/12 |
| 10,230,601 B1 * | 3/2019 | Qin | ............... | H04L 43/08 |
| 10,291,493 B1 * | 5/2019 | Rustad | ............... | H04L 43/04 |
| 10,333,791 B2 * | 6/2019 | Billore | ............... | H04L 41/145 |
| 10,333,820 B1 * | 6/2019 | Wang | ............... | H04L 43/045 |
| 2003/0120709 A1 * | 6/2003 | Pulsipher | ............... | G06F 9/4881 718/106 |
| 2008/0016115 A1 * | 1/2008 | Bahl | ............... | H04L 41/22 |
| 2013/0232497 A1 * | 9/2013 | Jalagam | ............... | G06F 9/5072 718/104 |
| 2014/0366037 A1 * | 12/2014 | Berretta | ............... | G06F 9/3836 718/106 |
| 2016/0253613 A1 * | 9/2016 | Tzadikevitch | ............... | G06Q 10/06 705/7.26 |
| 2019/0213561 A1 * | 7/2019 | Bhutani | ............... | G06Q 10/06311 |

\* cited by examiner

DISTRIBUTED COMPUTER TASK MANAGEMENT OF INTERRELATED NETWORK COMPUTING TASKS

BACKGROUND

Computers are ubiquitous and provide many different services. For example, computers are using to play video games, stream movies, perform complex calculations, backup pictures, store data, provide query requests, and many other functions. In many cases, tasks or jobs performed by computers are interrelated. Thus, the output of one task serves as an input for performing another task.

Many of the computer-related tasks or services performed by or provided by an enterprise are performed or provided by computers at a data center of the enterprise. For example, a business may have a set of server computers that provide news content to subscribers, video game access to users, or information regarding customer behavior. Maintaining and managing the set of server computers can be expensive and challenging. Each time new versions of software are released or server computers need to be upgraded or replaced, resources (such as human resources, time, and money) are expended by the business. It is not always feasible for the business to be competitive while maintaining the server computers.

Some of the above problems are solved by using network computing services provided by a third-party. These network computing services are sometimes referred to as "cloud computing" services. Some cloud computing services include Amazon Web Services (AWS), Microsoft Azure, and Google Cloud Platform. By using a network computing service, a business or other entity can access computing resources or provide computer related services while maintaining fewer or no computing systems.

SUMMARY OF EMBODIMENTS

The systems, methods, and devices of this disclosure each have several innovative aspects, no single one of which is solely responsible for the all of the desirable attributes disclosed herein. Details of one or more implementations of the subject matter described in this specification are set forth in the accompanying drawings and the description below.

In certain embodiments of the present disclosure, a computer-implemented method is disclosed. This method may be implemented by an interactive computing system configured with specific computer-executable instructions. The method may include receiving a plurality of computing task requests. The computing task requests may correspond to a plurality of computing tasks to be performed at a plurality of data centers comprising one or more network computing systems. Each of the one or more network computing systems may provide computing resources that are capable of performing at least one of the plurality of computing tasks. Further, the method may include generating a computing task dependency topology indicating a dependency relationship between two or more computing tasks of the plurality of computing tasks and determining anticipated network resource requirements to process the plurality of computing tasks by applying at least the computing task dependent topology and computing task metadata associated with the plurality of computing tasks to a network resource prediction function. The network resource prediction function may predict computing usage requirements to complete sets of computing tasks based at least in part on historical data relating to previously completed computing tasks. In addition, the method may include determining a network resource allocation at the one or more data centers based at least in part on the anticipated network resource requirements; allocating network computing resources at the one or more data centers based at least in part on the network resource allocation to obtain a network computing resource allocation; and distributing the plurality of computing tasks to the plurality of data centers based at least in part on the computing task dependency topology and the allocated network computing resources. At least one computing task may be provided to a different data center of the plurality of data centers than at least one other computing task of the plurality of computing tasks.

In some embodiments, the plurality of data centers may be associated with a different entity than the interactive computing system. Further, at least one of the plurality of data centers may be associated with a different entity than at least one other of the plurality of data centers. In addition, the computing task dependency topology may further indicate a dependency relationship between a first portion of a computing task of the plurality of computing tasks and a second portion of a computing task of the plurality of computing tasks. Moreover, the computing task dependent topology may indicate that at least one computing task from the plurality of computing tasks is not dependent on another computing task from the plurality of computing tasks. In some embodiments, the computing task metadata comprises data relating to at least one of a computing task type, a computing task priority level, a computing task owner that requested the computing task, or a computing task due date. Further, the network resource prediction function may be generated based at least in part on a machine learning algorithm. Moreover, determining the network resource allocation may comprise providing the anticipated network resource requirements to an objective function that distributes the plurality of computing tasks based on an objective. The objective may comprise one or more of reducing processing time, reducing cost, increasing utilization of available computing resources, or satisfying a service level agreement.

For some embodiments, the method may further include updating the computing task dependency topology based at least in part on the network computing resource allocation to identify network computing resources assigned to each computing task within the computing task dependency topology. In addition, allocating the network computing resources at the one or more data centers may further comprise maintaining an unallocated portion of network computing resources available at the one or more data centers to enable the processing of unscheduled computing tasks.

Certain embodiments of the present disclosure relate to a system. The system may include an electronic data store configured to store a computing task topology and a computing task management system comprising one or more hardware processors. The computing task management system configured to execute specific computer-executable instructions to at least: receive a plurality of computing task requests, the computing task requests corresponding to a plurality of computing tasks to be performed at one or more data centers comprising one or more computing systems; generate a computing task topology indicating a relationship between two or more computing tasks of the plurality of computing tasks; store the computing task topology at the electronic data store; determine predicted computing resource requirements to process the plurality of computing tasks by applying at least the computing task topology and computing task metadata associated with the plurality of computing tasks to a computing resource prediction function; determine a computing resource allocation at the one or more data centers based at least in part on the predicted computing resource requirements; allocate computing resources at the one or more data centers based at least in part on the computing resource allocation; and distribute the plurality of computing tasks to the one or more data centers based at least in part on the computing task topology and the allocated computing resources.

In certain embodiments, the relationship between the two or more computing tasks comprises a dependency between a portion of a first computing task of the plurality of computing tasks and a portion of a second computing task of the plurality of computing tasks. Further, the computing resource prediction function may be generated based at least in part on a machine learning algorithm. In addition, the computing task management system may be further configured to execute specific computer-executable instructions to at least determine the computing resource allocation using an objective function configured to maximize computing resource utilization of available computing resources at the one or more data centers. Moreover, the computing task management system may be further configured to execute specific computer-executable instructions to at least allocate a subset of the computing resources at the one or more data centers to process one or more unscheduled computing tasks received separately from the plurality of computing task requests, and wherein the plurality of computing task requests comprise scheduled computing tasks.

Certain embodiments of the present disclosure relate to a non-transitory computer-readable storage medium storing computer executable instructions that, when executed by one or more computing devices, configure the one or more computing devices to perform particular operations. These operations may include: receiving a plurality of computing tasks to be performed at one or more computing clusters; generating a computing task topology indicating a relationship between two or more computing tasks of the plurality of computing tasks; determining predicted computing resource requirements to process the plurality of computing tasks by applying at least the computing task topology to a computing resource prediction function; determining a computing resource allocation at the one or more computing clusters based at least in part on the predicted computing resource requirements; allocating computing resources at the one or more computing clusters based at least in part on the computing resource allocation; and distributing the plurality of computing tasks to the one or more computing clusters based at least in part on the computing task topology and the allocated computing resources.

In certain embodiments, the computing task topology further indicates a dependency relationship between a first portion of a computing task of the plurality of computing tasks and a second portion of a computing task of the plurality of computing tasks. Moreover, the computing prediction function may be generated based at least in part on an application of historical computing task data to a machine learning algorithm. In addition, the operations may further comprise redistributing at least some of the plurality of computing tasks based at least in part on receiving a set of unscheduled computing tasks. Further, the operations may further comprise redistributing at least some of the plurality of computing tasks based at least in part on a change in availability of computing resources of at least one of the one or more computing clusters.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Introduction

Figure 1:
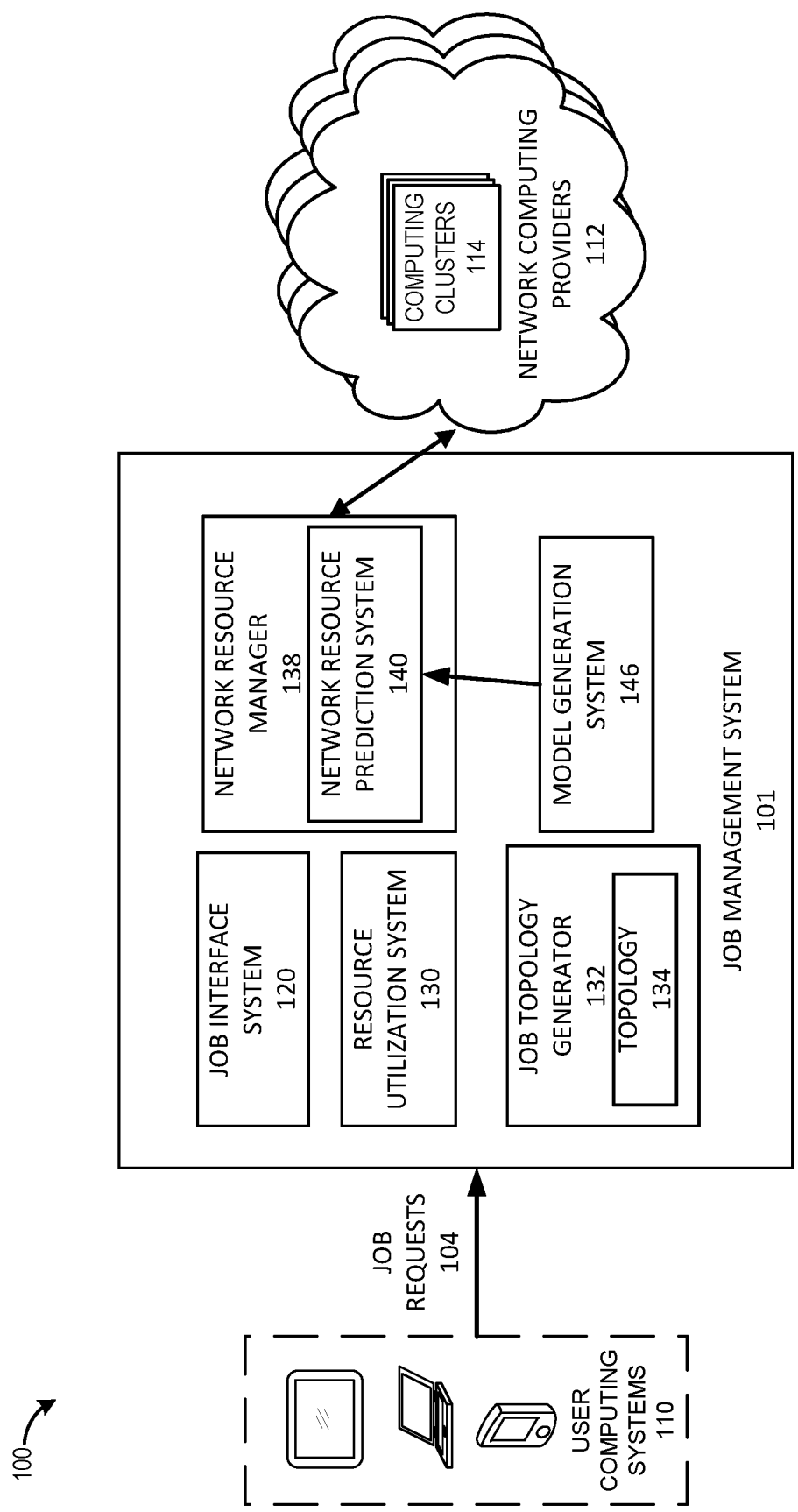
FIG. 1 illustrates an embodiment of a networked computing environment that can implement one or more embodiments of a job management system.

Using third-party network computing services can simplify computing system management, reduce costs, and allow an entity to focus its resources on the products or services it provides. Third-party network computing service providers are not all the same. Different third-party network computing service provides can provide different computing resources, may have different costs, and may have varying availability depending on, for example, the computing resources maintained and the number of customers or users of customers services. Further, the above variables may vary based on the day, time of day, service level agreements between customers and the third-party network computing service provider, customer events (such as release of a new product), world events (such as weather or political events), and many other factors. Some or all of the above factors can cause a third-party network computing service to experience fluctuating workloads.

In some cases, it is desirable to use multiple third-party network computing services. For example, it is generally desirable to use a lowest cost provider. However, in some cases, the lowest cost provider may not provide the best services. For example, a lowest cost provider may have slower computing systems, more system downtime, or less available computing resources. Further, individually negotiated service level agreements may result in one network computing provider being better (for example, cheaper or more guaranteed resource access when busy) for one customer while another networking computing provider may be better for another customer. Moreover, providing all jobs to a cheaper provider may result in less availability of computing resources because, for example, of higher demand or an unexpected burst of unscheduled jobs. In addition, interrelated jobs may cause downtime while one job waits for a related job to complete.

In some cases, using multiple network computing resource providers may allow an entity to optimize the allocation of jobs. For example, higher priority jobs may be provided to a more expensive network computing service provider that provides faster computing systems than a cheaper network computing service provider. However, the entity may provide lower priority jobs to the cheaper network computing service provider. Further, jobs that are interrelated or dependent on another job may be allocated in such a manner as to reduce the occurrence of one job waiting for another to complete by, for example, assigning one job whose output is required for another job to complete to a network computing resource provider that can prioritize the job.

Embodiments disclosed herein present a method and system that is capable of analyzing a set of jobs or tasks for an entity and determining a distribution of the jobs or tasks among a set of network computing providers. Further, the system can determine a dependency relationship between jobs and distribute the jobs among network computing providers based at least in part on the dependency relationship between the jobs. Moreover, in certain embodiments, the system can use machine learning algorithms to generate one or more prediction algorithms to predict future computing resource usage demands for performing a set of scheduled and ad hoc, or unscheduled, jobs. Based at least in part on the resource prediction, the dependency relationship between jobs, service level agreements with network computing service providers, and job resource requirements, the system can determine an improved or optimal distribution of jobs among the network computing service providers that satisfies or best satisfies one or more objective functions. These objective functions may be based on time, cost, performance, or other objectives that can be optimized using the job management system disclosed herein to distribute the jobs. Moreover, the job management system can interact with the network computing providers to allocate and assign computing resource for processing the jobs.

Example Networked Computing Environment

FIG. 1 illustrates an embodiment of a network computing environment 100. The network computing environment 100 includes one or more user computing systems 110 that can communicate with a job management system 101. Although not illustrated, in certain embodiments, the user computing systems 110 may communicate with the job management system 101 via a network. The job management system 101 includes a job interface system 120, a resource utilization system 130, a job topology generator 132, a network resource manager 138, and a model generation system 146. Although the job interface system 120, the resource utilization system 130, the job topology generator 132, the network resource manager 138, and the model generation system 146 are illustrated as part of the same job management system 101, it should be understood that one or more of the job interface system 120, the resource utilization system 130, the job topology generator 132, the network resource manager 138, and the model generation system 146 may be included in one or more other system(s). The network environment 100 also includes one or more computing clusters hosted of one or more network computing providers 112.

The network computing providers 112 may include a set of third-party providers of computing resources. The network computing providers 112 may sometimes be referred to as "cloud computing" providers. The computing resources may be provided by one or more computing clusters 114. These computing clusters 114 may be located at one or more data centers that may be distributed geographically. In some embodiments, a data center may include multiple computing clusters 114. In some cases, some of the computing clusters 114 at a data center may be configured differently or with different computing hardware or resources. The computing clusters 114 may vary for different network computing providers 112, at different data centers, or based on service level agreements. For example, computing clusters 114 of a first network computing provider may include computing systems with 4 core processors and 64 GB RAM and computing clusters 114 of a second network computing provider may include computing systems with 8 core processors and 32 GB RAM. Similarly, a computing cluster located in an East coast data center may be configured with x86 processors and a computing cluster located in a West coast data center may be configured with ARM processors.

The user computing systems 110 may include hardware and software components for establishing communication with another computing system, such as the job management system 101, over a communication network. For example, the user computing system 110 may be equipped with networking equipment and network software applications (for example, a web browser) that facilitate communications via a network (for example, the Internet) or an intranet. The user computing system 110 may include a number of local computing resources, such as central processing units and architectures, memory, mass storage, graphics processing units, communication network availability and bandwidth, and so forth. Further, the user computing system 110 may include any type of computing system. For example, the user computing system 110 may include any type of computing device(s), such as desktops, laptops, video game platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the user computing system 110 may include one or more of the embodiments described below with respect to FIG. 6 and FIG. 7.

The user computing systems 110 can provide a plurality of job requests 104 to the job management system 101. The user computing systems 110 may be associated with the same entity as the job management system 101. For example, the user computing systems 110 may be employee computers that may be used to generate one or more job requests, which can be performed by the computing clusters 114. The job requests 104 may include a plurality of jobs to be performed by computing clusters 114 of the one or more network computing providers 112. These job requests may be related to one or more video game related tasks. However, the types of jobs are not limited as such and may include tasks related to applications other than video games. The jobs may include, for example, requesting metadata related to one or more video game services. For example, a job may request average user play time for a particular video game, average time at a particular portion of a video game, average monetary amount spent on in-game extras for a video game, average processor generation of computers accessing the video game, a graph of user playtime over time for a video game, and the like. Some additional examples of jobs may include requesting a financial forecasting (for example, an estimate or prediction of the number of users expected to purchase a particular video game asset or object, or an expansion or downloadable content); a computing resource capacity forecast (for example, an amount of computing resources to release a video game to the publish such that users can access the video game serves without errors or lag exceeding a threshold); a fraud detection operation; game launch reporting (for example, a request that a series of plots be generated relating to a game launch, such as sales, daily active users, and the like); or training of machine learning models based on data (for example, a player matchmaking or recommendation system model).

In some embodiments, jobs may be interrelated or dependent on the result of earlier jobs. For example, if a first job requests a determination of average play time for different video game types offered by a publisher for different sets of users (for example, male and female across different age categories), a number of related jobs may be requested. These related jobs may include preliminary jobs that are to be completed prior to the first job to enable completion of the first job. For example, the preliminary or predecessor jobs may include determining average play time for each video game offered by the publisher, average play time across genders, and average play time across age categories. Further, the first job may be related to subsequent jobs, such as determining a change in average playtime across different video games offered by the publisher and determining the change in average playtime for different gender and age-ranges.

The job interface system 120 of the job management system 101 may include a system that can receive the job requests 104 from the user computing systems 110. In some embodiments, the job interface system 120 may run as a background process that continues receiving and processing job requests in accordance with the embodiments described herein. Although embodiments disclosed herein may be performed for a single job, typically the job requests 104 include a large number of jobs, such as hundreds, thousands, hundreds of thousands, or more jobs, or any range of jobs between the foregoing. Some of the jobs may be interrelated, some jobs may depend on some other jobs, or some jobs may be isolated or not dependent on other jobs. The job requests 104 may include information about types of the jobs to be executed, or other information that can assist the job management system 101 in allocating the jobs. In some cases, the plurality of jobs may include both scheduled and unscheduled jobs, which may also be referred to as ad hoc jobs. The scheduled jobs may include jobs that can be pre-requested or anticipated. For example, scheduled jobs may include jobs relating to a scheduled release of a video game, a scheduled expansion for the video game, or a scheduled holiday. For example, the scheduled jobs may include tasks relating to tracking the percentage of existing users who obtain the scheduled expansion, the amount of new users who obtain a copy of the video game after the expansion is released, the amount of new users who obtain both the video game and the expansion after release of the expansion, the average amount of time the video game is player over the scheduled holiday, and the like. Further, the scheduled jobs may include extract, transform, load (ETL) jobs. ETL jobs may include jobs that involve extracting data from one or more data sources, transforming the data for storing in a particular format or structure, and loading the data into a target database or repository. For example, each day a set of tables may be generated from new data ingested each day relating to video game management and execution. This data may include, for example, the amount of game play hours spent per user and/or for all users for the day, session duration for video game sessions played that day, in-game spending that occurred for the day, and the like. In addition, the scheduled jobs may include reporting jobs. Some example of scheduled reporting jobs are the ones that are run daily or hourly to generate plots for dashboards, such as system monitoring dashboard, financial statistics dashboard and game play dashboard (for example, engagements, in-game purchases, churn rate, and the like).

Unscheduled jobs may include jobs that are requested by a user without being previously scheduled or anticipated based on a scheduled event. For example, a new user at the publisher may request information about release history of different development versions of a video game. It is difficult to anticipate or preschedule the job because it is specific to the new user's curiosity. Another example of an unscheduled event may include a request for sales of a video game before and after an unanticipated review of the video game goes viral. Unscheduled jobs may include jobs that users, such as data analysts, run or request in an ad hoc manner or that have not been previously scheduled. Ad hoc or unscheduled jobs may be data exploratory jobs where the value of the job or the data is not yet determined or where a new event is being examined. For example, an analyst user may want to understand a trend of user spending after a new patch is released. As another example, an analyst user may want to understand how a recent advertising campaign impacted new game purchases. Typically, although not necessarily, the ad hoc or unscheduled jobs are requested once, a few times, or occasionally, and may not be repeated more frequently. However, in some embodiments, an ad hoc job may be requested repeatedly or often.

In some embodiments, some unscheduled jobs may become scheduled jobs. For example, if it is determined than an ad hoc job is being performed repeatedly, it may be added to a set of scheduled jobs making it easier to predict resource requirements. For example, if it is determined that a job has a wider applicability than initially understood (for example, the jobs is useful across multiple video games), the job may be promoted as a scheduled job and the job may be run daily enabling other analysts beyond the initial requesting analyst to use the data directly without requesting the job be repeated due, for example, to being unaware of the previous ad hoc request for the job.

The resource utilization system 130 of the job management system 101 can include any system that can determine computing resources to complete a job. In some cases, the resource utilization system 130 may determine the minimum computing resources, preferred computing resources, and optimal computing resources to complete a job. For example, the resource utilization system 130 may determine that at a minimum, 64-bit processors are required for the job, that it is preferred to have 4-core processors to complete the job, and that have 32 GB of RAM is optimal as, for example, more RAM may not affect job speed and less RAM may slow the completion of the job. In some embodiments, the resource utilization system 130 may determine the computing resources available at one or more network computing provides 112. Determining the computing resources available at the one or more network computing providers 112 may include determining the computing resources available for completing the job, the computing resources available based on an agreement between the an entity associated with the job management system 101 and the one or more network computing providers 112, and the resources allocated for performing other jobs.

The job topology generator 132 of the job management system 101 includes any system that can create a topology 134 of the jobs associated with the job requests 104. The topology 134 may reflect a job ordering for completing a set of jobs. The job topology may indicate that some jobs are interrelated or dependent on other jobs. Further, in some embodiments, the topology 134 may identify jobs that are not dependent on other jobs. Further, the topology 134 may specify a set of computing resources either preferred or required to perform each job listed in the topology 134. The topology 134 of the jobs may include a mapping of jobs based on job dependency. In other words, the topology 134 may indicate a dependency relationship between one or more jobs of the plurality of jobs. For example, if job B requires the output of job A, job B can be said to depend on job A. The topology 134 in this example may identify that job A is to be completed before job B is initiated. In some cases, a job may partially depend on another job. Thus, in the prior example, the topology 134 may specify that job B may be initiated before job A is completed, but that job A should be completed at a particular time in relation to job B to minimize downtime. It should be understood that job B could be initiated at any time, but if job A is not completed, the assigned computing resources may be utilized suboptimally because, for example, the computing resources are allocated but not being used while waiting for the completion of job A. In some embodiments, a job may depend on multiple jobs or no jobs. Further, in some embodiments, the job topology generator 132 may determine the set of computing resources to include in the topology 134 for a job based on job metadata that may specify, for example, the type of job, an urgency of the job, an expected length of time to complete the job, a desired cost for the job, an owner of the job, or any other information that may affect the resources allocated to perform the job.

The model generation system 146 can use one or more machine learning algorithms to generate one or more prediction models or parameter functions. One or more of these parameter functions may be used to determine an expected value or occurrence based on a set of inputs. For example, a prediction model can be used to determine an amount of computing resources from a set of computing clusters 114 of a number of network computing providers 112 that may be needed to perform a set of jobs or tasks based on one or more inputs to the prediction model, such as, for example, a set of historical jobs performed and job metadata for previous requested jobs. In some cases, the prediction model may be termed a prediction model because, for example, the output may be or may be related to a prediction of an action or event, such as the prediction that an amount of computing resources are required or that a set of jobs are requested. A number of different types of algorithms may be used by the model generation system 146. For example, certain embodiments herein may use a logistical regression model. However, other models are possible, such as a linear regression model, a discrete choice model, or a generalized linear model.

The machine learning algorithms can be configured to adaptively develop and update the models over time based on new input received by the model generation system 146. For example, the models can be regenerated on a periodic basis as additional job history is obtained or as types of jobs evolve over time. The model generation system 146 is described in more detail herein. After a model is generated, it can be provided to the network resource prediction system 140 to facilitate the management of job resources at one or more computing clusters 114 of the one or more network computing providers 112.

Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

The network resource manager 138 may include any system that can interact with computing clusters 114 of the network computing providers 112. Further, the network resource manager 138 may include any system that can reserve or obtain computing resources from the computing clusters 114 and assign one or more jobs to the computing clusters 114. In some embodiments, the network resource manager 138 may provide a result of the performance of a job by one computing cluster to another computing cluster of a different network computing provider. Alternatively, or in addition, the network resource manager 138 may specify to the computing cluster that a job result is to be provided to another computing cluster of another network computing provider.

The network resource manager 138 may include a network resource prediction system 140 that can determine an anticipated network computing resource requirement to process one or more jobs. In some embodiments, the network resource prediction system 140 applies the topology 134 to a prediction function generated by the model generation system 146 to predict future computing resource requirements to perform one or more future jobs. In some embodiments, the network resource prediction system 140 applies the job metadata associated with the plurality of jobs to a prediction function to predict future computing resource requirements. The network resource manager 138 may use the predicted resource requirements to allocate or reserve compute resources at the computing clusters 114. In some embodiments, the network resource manager 138 may provide topology 134 and the predicted future computing resource requirements to an objective function. This objective function may determine an optimal or preferred allocation of jobs to the computing clusters 114 based on a desired objective, such as time, cost, satisfying service level agreements, or job distribution among network computing providers 112. In some embodiments, jobs may be weighted differently based on the job. For example, some jobs may be identified as priority. This weighting may be stored in the topology 134 and may affect one or more of the prediction of future computing resource usage or determining the allocation of jobs using the objective function.

The network resource manager 138 can distribute the plurality of jobs to the network computing providers 112 to be executed by the computing clusters 114. The network resource manager 138 may distribute the jobs based at least in part on the topology 134 created by the job topology generator 132. The network resource manager 138 may distribute the jobs based at least in part on the allocated computing resources at the network computing providers 112 and one or more objective functions as described above.

In some embodiments the job management system 101 and at least one of the one or more network computing providers 112 may be associated with the same entity. However, typically, the one or more network computing providers 112 are associated with a different entity than the job management system 101.

In certain embodiments, the topology 134 may be updated over time as more jobs are received or the availability of computing resources at the network computing providers 112 changes. For example, the network resource prediction system 140 may determine a new anticipated computing resource requirement based on the receipt of one or more unscheduled jobs. Based at least in part on such new anticipated network resource requirement, the topology generator 132 may update the topology 134 to reassign computing resources to one or more jobs. Further, the topology 134 may be updated based on changes to the objective function or changes new jobs cause to an output of the objective function.

Example Model Generation System

Figure 2:
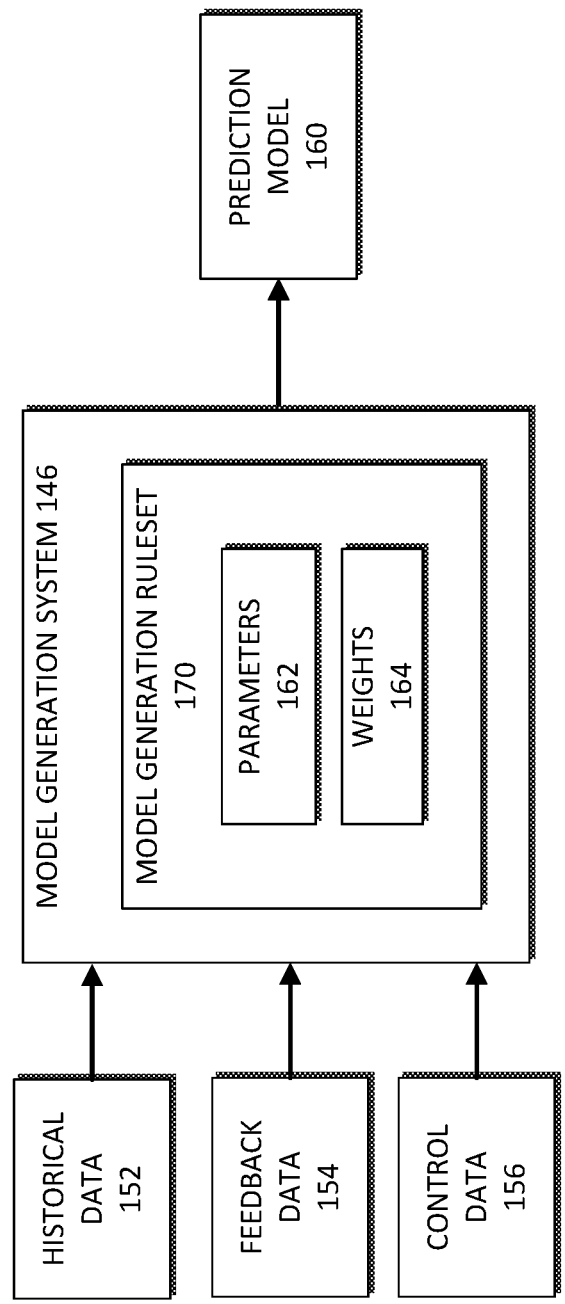
FIG. 2 illustrates an embodiment of a model generation system of FIG. 1.

FIG. 2 illustrates an embodiment of the model generation system 146 of FIG. 1. The model generation system 146 may be used to determine one or more prediction models 160 based on historical data 152 for a number of jobs. Typically, although not necessarily, the historical data 152 includes data associated with a large number of jobs, such as hundreds, thousands, hundreds of thousands, or more jobs. However, the present disclosure is not limited as such, and the number of jobs may include any number of jobs. Further, the historical data 152 can include data received from one or more data sources, such as, for example, one or more user computing systems 110 and/or one or more computing clusters 114. Moreover, the historical data 152 can include data from different data sources, different data types, and any data generated by one or more jobs or the performance of one or more jobs. In some embodiments, the historical data 152 may include a very large number of data points, such as millions of data points, which may be aggregated into one or more data sets. In some embodiments, the historical data 152 is limited to historical information about the job management system 101, but in other embodiments, the historical data 152 may include information from one or more other job management systems. Further, in some embodiments, one or more subsets of the historical data are limited by a date restriction, such as for example, limited to include only data from the last 6 months. The historical data 152 may include user interaction data for the users with respect to one or more requested jobs.

The model generation system 146 may, in some cases, also receive feedback data 154. This data may be received as part of a supervised model generation process that enables a user, such as an administrator, to provide additional input to the model generation system 146 that may be used to facilitate generation of the prediction model 160. For example, if an anomaly exists in the historical data 152, the user may tag the anomalous data enabling the model generation system 146 to handle the tagged data differently, such as applying a different weight to the data or excluding the data from the model generation process.

Further, the model generation system 146 may receive control data 156. This control data 156 may identify one or more features or characteristics for which the model generation system 146 is to determine a model. Further, in some cases, the control data 156 may indicate a value for the one or more features identified in the control data 156. For example, suppose the control data 156 indicates that a prediction model is to be generated using the historical data 152 to determine a predicted amount of processor utilization time for completing a set of jobs. If the amount of time each job from the jobs included as part of the historical data 152 was processed is known and/or the type of hardware processors used to execute the processes is know, this data may be provided as part of the control data 156, or as part of the historical data 152. The resultant prediction model 160 may be used to predict job processing time for a set of jobs or processor utilization time for a set of jobs. Alternatively, or in addition, the resultant prediction model 160 can be used to predict an amount of hardware processors or an amount of hardware processors of a particular type that is required to complete a set of jobs within a particular time period.

The model generation system 146 may generally include a model generation rule set 170 for generation of the prediction model 160. The rule set 170 may include one or more parameters 162. Each set of parameters 162 may be combined using one or more mathematical functions to obtain a parameter function. Further, one or more specific parameters may be weighted by the weights 164. In some cases, the parameter function may be obtained by combining a set of parameters with a respective set of weights 164. The prediction model 160 and/or the respective parameters 162 of the prediction models 160 may be derived during a training process based on particular input data, such as the historical data 152, feedback data 154, and control data 156, and defined output criteria, which may be included with the control data 156, used for training purposes. The model generation rule set 170 can define the specific machine learning rules and/or algorithms the model generation system 146 uses to generate the model based on a defined objective function, such as determining a computing resource utilization rate. In some embodiments, initial parameters 162 and weights 164 can be manually provided during the initiation of the model generation process. The parameters 162 and weights 164 can be updated and modified during the model generation phase to generate the prediction model 160. In some embodiments, weights may be applied to the parameter functions or prediction models themselves. For example, the mathematical complexity or the number of parameters included in a particular prediction model 160 may affect a weight for the particular prediction model 160, which may impact the generation of the model and/or a selection algorithm or a selection probability that the particular prediction model 160 is selected.

The model generation system 146 can filter and categorize the historical data sets according to various characteristics and parameters of the data. For example, the data can be categorized by the data source (such as, for example, job metadata, network computing provider data, or user computing system data), information type (such as, for example, the types of jobs, the urgency of each job, or the source of the job), or other categories associated with the data. The model generation system 146 can filter the information to identify the information for further processing. In some embodiments, the model generation system 146 is configured to filter and separate the historical data 152 into a plurality of data types or categories before further processing. Moreover, in some cases, some of the historical data 152 may be filtered out or removed from the historical data 152 based on the data being associated with a relevance that does not satisfy a threshold relevance as determined by the model generation system 146.

After the prediction model 160 has been generated, the model can be used during runtime of the network resource prediction system 140. In some embodiments, the prediction model 160 may be used to facilitate predicting network resource requirements for a set of scheduled jobs, unscheduled jobs, or a combination of scheduled and unscheduled jobs.

Example Network Resource Prediction System

Figure 3:
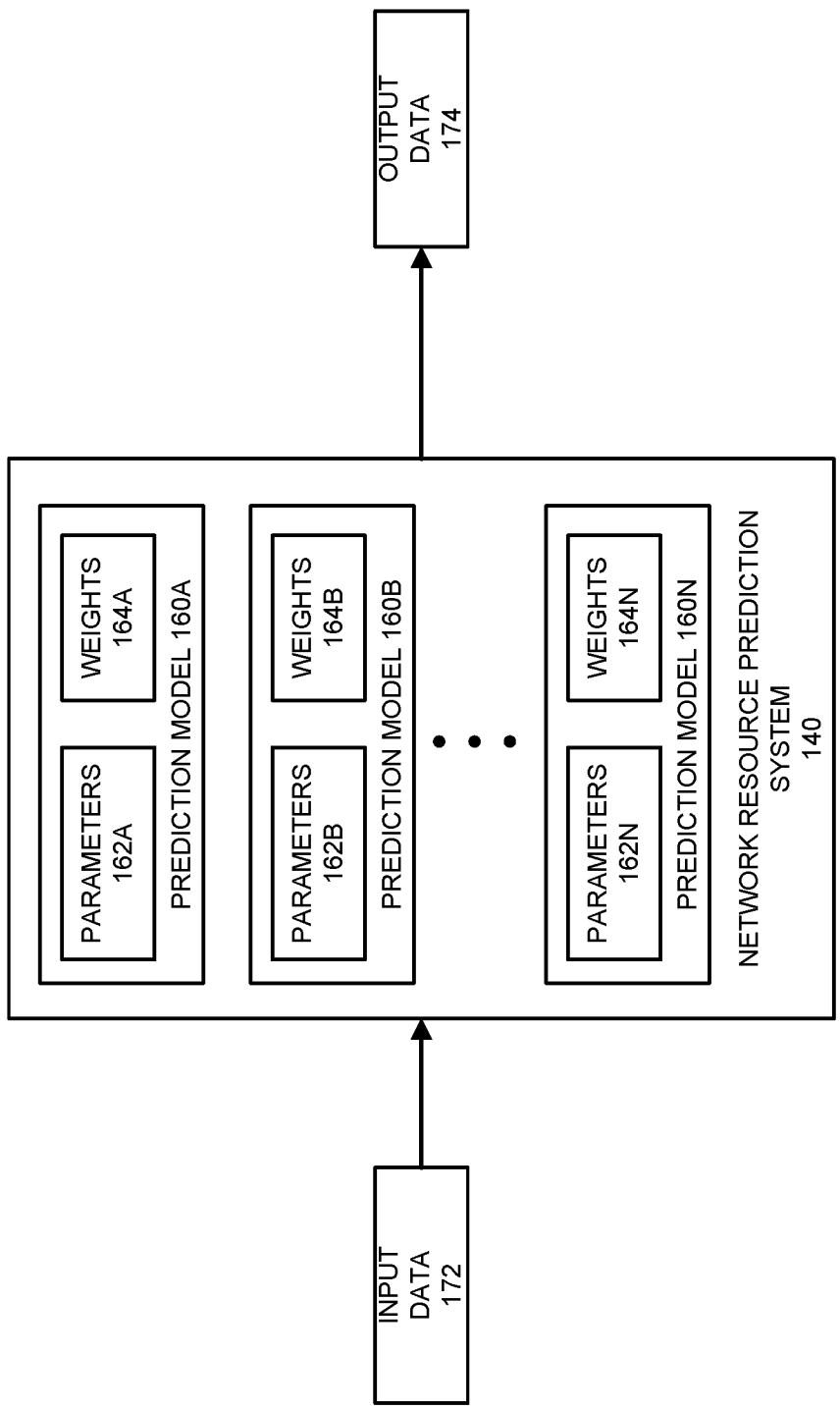
FIG. 3 illustrates an embodiment of a network resource prediction system of FIG. 1.

FIG. 3 illustrates an embodiment of a network resource prediction system 140 of FIG. 1. The network resource prediction system 140 can apply or use one or more of the prediction models 160 generated by the model generation system 146. Although illustrated as a separate system, in some cases, the features of the network resource prediction system 140 are performed by the network resource manager 138. The network resource prediction system 140 may use one or more prediction models 160A, 160B, 160N (which may be referred to collectively as "prediction models 160" or in the singular as "prediction model 160") to process the input data 172 to obtain the output data 174.

The network resource prediction system 140 may apply the prediction model(s) 160 during determination of the job dependent topology associated with the plurality of jobs. In some embodiments, the one or more prediction models 160 are applied after receipt of a plurality of jobs to determine an expected or predicted network computing resource usage. The input data 172 can include one or more pieces of data associated with the received jobs. The data may include information relating to the type of jobs received, a priority for performing the jobs, service level agreements relating to completion of the jobs, dependency information for different jobs, source or owner of the jobs, context information for the jobs, and the like. In some embodiments, the input data 172 can be filtered before it is provided to the network resource prediction system 140.

In some embodiments, a single prediction model 160 may exist for the network resource prediction system 140. However, as illustrated, it is possible for the network resource prediction system 140 to include multiple prediction models 160. The network resource prediction system 140 can determine which prediction model, such as any of models 160A-N, to use based on input data 172 and/or additional identifiers associated with the input data 172. Additionally, the prediction model 160 selected may be selected based on the specific data provided as input data 172 including the specific jobs or job metadata. The availability of particular types of data as part of the input data 172 can affect the selection of the prediction model 160. For example, the inclusion of job priority data as part of the input data may result in the use of prediction model 160A. However, if job priority data is not available for a particular job, then prediction model 160B may be used instead. In certain embodiments, it may be relatively easy to predict computing resources required to perform scheduled jobs because, for example, the operations used to perform the scheduled jobs and the amount of data to be processed may be determined in advance. However, it can be more challenging to predict the computing resources that may be used to complete an ad hoc job because, for example, the existence of the ad hoc job, and the data and operations to be performed as part of the ad hoc job may not be known in advance. However, embodiments disclosed herein can use historical data to generate a prediction model to predict the amount of computing resources that may be required to perform a set of jobs, or a set of jobs during a particular time period. This prediction, based for example on the historical data, may include an amount of computing resources expected to be used by ad hoc jobs.

The output data 174 can be a predicted amount of demand on the computing clusters or other computing resources available at the network computing providers 112. Further, in some embodiments, the output data 174 may include a predicted computing resource usage for a set of received jobs. Alternatively, or in addition, the output data may be a predicted computing resource usage for a set of future jobs that is determined based at least in part on a current set of jobs.

The prediction models 160A, 160B, 160N may generally include a set of one or more parameters 162A, 162B, 162N, respectively (which may be referred to collectively as "parameters 162"). Each set of parameters 162 (such as parameters 162A) may be combined using one or more mathematical functions to obtain a parameter function. Further, one or more specific parameters from the parameters 162A, 162B, 162N may be weighted by the weights 164A, 164B, 164N (which may be referred to collectively as "weights 164"). In some cases, the parameter function may be obtained by combining a set of parameters (such as the parameters 162A) with a respective set of weights 164 (such as the weights 164A).

Example Process for Job Allocation Computing

Figure 4:
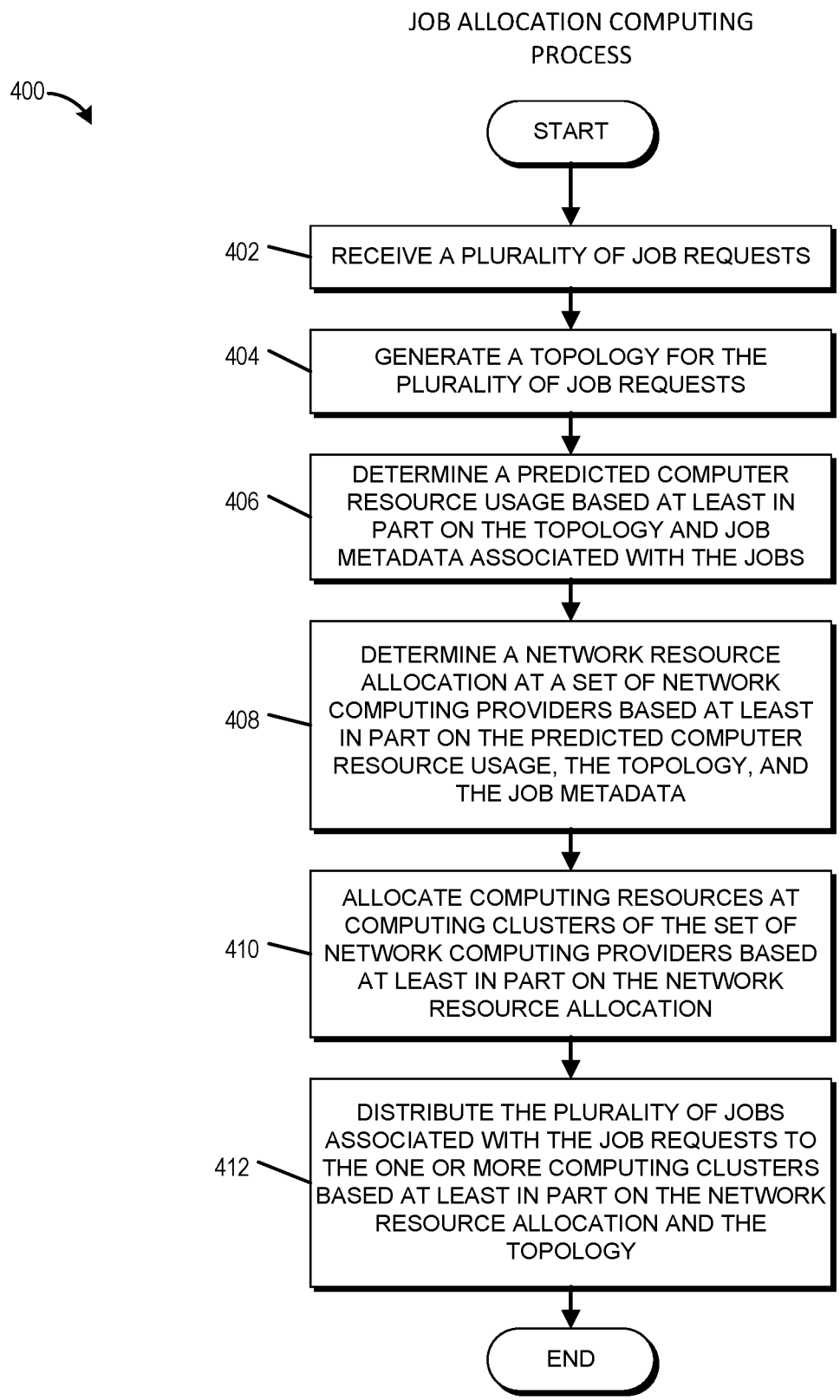
FIG. 4 presents a flowchart of an embodiment of a job allocation computing process.

FIG. 4 presents a flowchart of an embodiment of a job allocation computing process 400. The process 400 can be implemented by any system that can allocate a set of jobs among computing clusters provided by a plurality of network computing providers. The process 400, in whole or in part, can be implemented by, for example, a job management system 101, a job interface system 120, a resource utilization system 130, a job topology generator 132, or a network resource manager, among others. Although any number of systems, in whole or in part, can implement the process 400, to simplify discussion the process 400 will be described with respect to particular systems. Further, it should be understood that the process 400 may be repeated each time additional job requests are received. In some cases, the process 400 is performed in response to a trigger. For example, the process 400 may be performed in response to receiving a command from a user. In other embodiments, the process 400 is performed automatically each time a set of jobs is received or after a threshold number of jobs is received. In some embodiments, the process 400 is repeated, at least in part, each time a set of additional jobs is received regardless of whether a previous set of jobs are still being processes. In some embodiments, the receipt of additional jobs may result in a modification of a topology 134 and a modification in an assignment of jobs to computing clusters 114 of different network computing providers 112.

The process 400 begins at block 402 where the job interface system 120 of the job management system 101 receives a plurality of job requests. These job requests may be received from one or more user computing systems 110. In some embodiments, the jobs may be scheduled or anticipated jobs due, for example, to the jobs being repetitive or associated with scheduled events, such as release of a new video game, start of a peak game play period as determined by historical data, or some other scheduled time or event. The user computing systems 110 may be associated with a particular entity that includes the job management system 101. Alternatively, one or more of the user computing systems 110 may be associated with a different entity or user. The job requests may correspond to a plurality of jobs to be performed at one or more computing clusters of one or more network computing providers 112. In some embodiments, the computing clusters may be located at different data centers of a network computing provider 112. Further, the network computing providers 112 may be associated with different entities from the job management system 101 and the user computing systems 110.

At block 404, the job topology generator 132 generates a topology for the plurality of job requests. The topology may indicate a dependency relationship between two or more jobs of the plurality of jobs identified by the job requests received at the block 402. Further, the topology may include job metadata received for the jobs as part of the job requests. As previously described, this job metadata may include any information that can facilitate determining computing resources for performing a job. For example, the job metadata may identify a priority for the job, a type of computing resources required or requested to complete the job, or a maximum desired cost for performing the job.

At block 406, the network resource prediction system 140 determines a predicted computer resource usage based at least in part on the topology and the job metadata associated with the jobs. Determining the predicted computer resource usage can include using a prediction model 160 to predict the computer resource usage for the jobs and/or to perform jobs within a particular time period. In some cases, the network resource prediction system 140 may provide the topology as an input to the prediction model 160 that is generated by the model generation system 146. In some cases, the network resource prediction system 140 may apply the job metadata as input to the prediction model 160.

The predicted computer resource usage may provide a prediction of an amount of different types of computing resources used to complete the set of jobs. For example, the predicted computer resource usage may include a prediction of total CPU usage, total RAM usage, total non-volatile memory usage, a prediction of process cores used, a prediction of types of CPU usage, and prediction of any other type of computing resource usage. In some embodiments, a new or updated topology is generated based on the prediction of computing resources for performing the set of jobs or compute tasks. The updated topology may reflect the assignment of different computing resources for different jobs within the topology.

At block 408, the network resource manager 138 determines a network resource allocation at a set of network computing providers 112 based at least in part on the predicted computer resource usage, the topology, and the job metadata. For example, if it is predicted that a set of jobs requires ten hardware processors to be completed within an allotted time, the jobs may be distributed among ten hardware processors or to one or more computing clusters that can allocate ten hardware processors to complete the jobs.

In some embodiments, the network resource manager 138 provides the predicted computer resource usage, the topology, and the job metadata to an objective function to determine a network resource allocation that satisfies or is closest to satisfying the objective function. For example, suppose the objective criterion is to satisfy a service level agreement (SLA) that permits the use of only five hardware processors at a time. Continuing the previous example, to minimize processing time, the set of jobs may be distributed among two network computing providers 112 that can each allocate five processors to the jobs. Thus, the SLA is met and the predicted requirement of ten processors is satisfied. Alternatively, the set of jobs may be distributed among processors of three network computing providers 112 (for example, 3, 3, and 4 processors of three network computing providers 112, respectively) thereby reserving processors for potential unscheduled jobs.

The objective function may include attempt to allocate jobs in a manner that best fits the desired objective or, in some cases, set of objectives. For example, the objective function may determine a network resource allocation that evenly distributes jobs among a subset of network computing providers that offer the lowest cost. As another example, the objective function may determine a network resource allocation that provides higher priority jobs to network computing providers 112 with computing clusters 114 that have the least downtime or errors while providing lower priority jobs to the lowest costs network computing providers. In some embodiments, the objective function may be configured to reserve a particular percentage of computing resources available at a computing cluster or network service provider for unscheduled or ad hoc jobs. Thus, although an entity may have purchased access to 3 hours a day of four 4-core processors, only 2.5 hours may be allocated leaving half an hour in reserve for ad jobs.

At block 410, the network resource manager 138 allocates network computing resources at the one or more computing clusters of the set of network computing providers 112 based at least in part on the network resource allocation. Allocating the computing resources may include communicating with the computing clusters 114, or with resource management systems at the network computing providers 112, to reserve computing resources for the jobs at the computing clusters 114 or to instantiate instances of computing resources for particular jobs within the job topology. In some embodiments, allocating the network computing resources may include confirming the availability of the computing resources. If it is determined that sufficient computing resources to perform a job are not available, portions of the process 400 may be repeated with updated metadata indicating the lack of availability of particular computing clusters 114. In some embodiments, a daemon process or thread may monitor received jobs and the availability of resources at computing clusters of the network computing providers. The information collected by the daemon process may be provided to the objective function to facilitate the allocation of network computing resources among the jobs.

At block 412, the network resource manager 138 distributes the plurality of jobs associated with the job requests to the one or more computing clusters based at least in part on the network resource allocation and the topology. The plurality of jobs may be distributed based on one or more desired objectives and differences between availability of resources, service level agreements, or rate structures for different network computing providers 112. The computing clusters 114 may be located at different data centers and/or associated with different network computing providers 112. The different data centers may have different computing resources. For example, one data center may have newer, faster processors than another data center. As a second example, one data center may have computing systems with more RAM than another data center. Similarly, different network computing providers 112 may have computing clusters 114 with different hardware or computing resource available for processing jobs. Moreover, different network computing provides 112, regardless of whether the available computing resources differ, may charge different rates, make different computing resources available to a user or entity, or have different resource availability guarantees. Further, in some embodiments, different network computing providers 112 may have computing clusters 114 located at different geographic locations, which can affect the availability or speed in transmitting jobs and receiving outputs of completed jobs for a particular entity because, for example, in a difference in distance between the job management system 101 of the entity and the computing clusters 114 of different network computing providers 112.

Based on the differences between the available computing resources and/or rates of different network computing providers 112, the jobs may be distributed to best satisfy the objective function. Further, the distribution of jobs may be based on the dependency between jobs and metadata associated with the jobs. For example, higher priority jobs may be assigned to network computing providers 112 that have faster hardware, but which may be more expensive. Lower priority jobs may be assigned to network computing providers 112 that are cheaper, but may have slower hardware. In another example, jobs whose output are not required to be used for other jobs may be assigned to network computing providers with slower hardware or less availability, which could result in more queuing of jobs. In contrast, jobs whose output is required for future jobs or other jobs may be assigned to network computing providers with faster hardware or more availability to process a job without queuing the job to await available resources. Advantageously, in certain embodiments, by distributing jobs among different network computing providers 112 or different computing clusters of network computing providers 112, jobs may be completed in a manner that more closely satisfies a desired objective. For example, jobs may be completed faster, more accurately, or cheaper. Further, multiple objectives may be used for a set of jobs enabling jobs associated with different priorities to be assigned to different systems enabling both faster and cheaper completion of jobs based on job priority.

In some embodiments, the jobs are distributed based at least in part on the objective function. The result of a completed job may be provided to the job management system 101, which can provide the result to the user computing system 110 that provided the job request at the block 402. Alternatively, the job provided to the computing cluster may identify the user computing system 110 that provided the initial request enabling the computing cluster 114 to provide the result of the completed job directly to the user computing system without sending it to the job management system 101. In some embodiments, the computing cluster 114 may use the job result as an input to another job provided to the computing cluster 114. Alternatively, or in addition, the computing cluster 114 may provide the job result to a computing cluster of another network computing provider tasked with performing a second job that uses the job result as an input to the second job.

Example Prediction Model Generation Process

Figure 5:
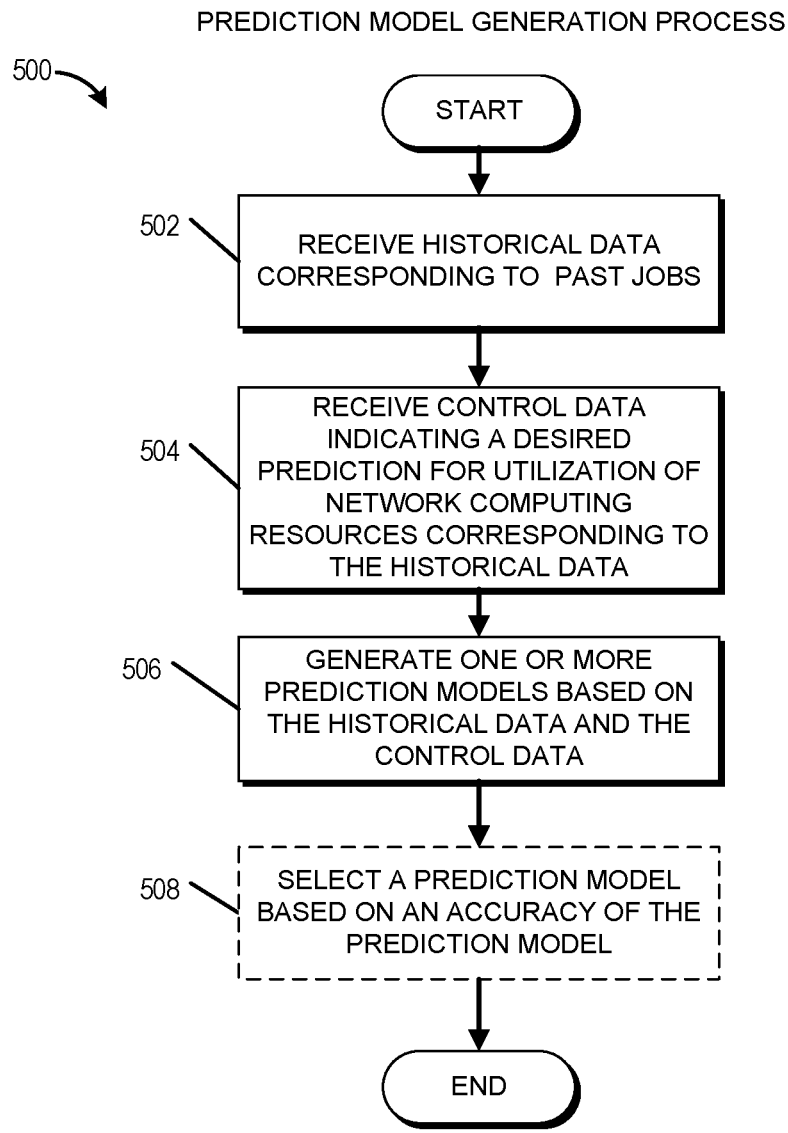
FIG. 5 presents a flowchart of an embodiment of a prediction model generation process.

FIG. 5 presents a flowchart of an embodiment of a prediction model generation process. The process 500 can be implemented by any system that can generate one or more parameter functions or prediction models that include one or more parameters. In some cases, the process 500 serves as a training process for developing one or more parameter functions or prediction models based on historical data or other known data. The process 500, in whole or in part, can be implemented by, for example, a job management system 101, a network resource prediction system 140, a model generation system 146, or a user computing system 110, among others. Although any number of systems, in whole or in part, can implement the process 500, to simplify discussion, the process 500 will be described with respect to particular systems. Further, it should be understood that the process 500 may be updated or performed repeatedly over time. For example, the process 500 may be repeated once per month, after the receipt of a particular number of jobs, with the addition of or removal of access to resources of a network computing provider 112, with a change in computing resources available at an existing network computing provider 112, or with a change in a service level agreement with a network computing provider. However, the process 500 may be performed more or less frequently.

The process 500 begins at block 502 where the model generation system 146 receives historical data 152 corresponding to past jobs performed or monitored by the job management system 101. This historical data 152 may serve as training data for the model generation system 146. The historical data 152 may include information relating to the duration of time spent executing similar type of jobs; the monetary cost to execute similar type of jobs; and the like.

At block 504, the model generation system 146 receives control data 156 indicating a desired prediction criteria corresponding to the historical data 152. This control data 156 may indicate one or more features or characteristics for which the model generation system 146 is to determine a model. Alternatively, or in addition, the control data 156 may include a value for the features or characteristics that are associated with the received historical data 152. For example, the control data 156 may identify prediction of future computing resource usage as the desired feature to be predicted by the model that is to be generated by the model generation system 146. In some embodiments, the control data 156 may include multiple characteristics or features to be predicted by the model to be generated by the model generation system 146. For example, the control data 156 may identify predicted computing resource usage and predicted completion time for a set of jobs.

At block 506, the model generation system 146 generates one or more prediction models 160 based on the historical data 152 and the control data 156. The prediction models 160 may include one or more variables or parameters 162 that can be combined using a mathematical algorithm or model generation ruleset 170 to generate a prediction model 160 based on the historical data 152 and, in some cases, the control data 156. Further, in certain embodiments, the block 506 may include applying one or more feedback data 154. For example, if the prediction model 160 is generated as part of a supervised machine learning process, a user (for example, an administrator) may provide one or more inputs to the model generation system 146 as the prediction model 160 is being generated and/or to refine the prediction model 160 generation process. For example, the administrator may be aware that a particular job was a special request from a user and is not likely to be repeated. In such a case, the administrator may supply feedback data 154 to reduce the weight of a portion of the historical data 152 that may correspond to the specially requested job. Further, in some cases, one or more of the variables or parameters may be weighted using, for example, weights 164. The value of the weight for a variable may be based at least in part on the impact the variable has in generating the prediction model 160 that satisfies, or satisfies within a threshold discrepancy, the control data 156 and/or the historical data 152. In some cases, the combination of the variables and weights may be used to generate a prediction model 160.

The model generation system 146, at block 508, based at least in part on an accuracy of the prediction model 160 and, optionally, any associated penalty or weighting selects a prediction model 160. In some embodiments, the model generation system 146 selects a prediction model 160 associated with a lower penalty compared to another prediction model 160. However, in some embodiments, the model generation system 146 may select a prediction model associated with a higher penalty if, for example, the output of the prediction model 160 is a threshold degree more accurate than the prediction model associated with the lower penalty. In certain embodiments, the block 508 may be optional or omitted. For example, in some cases, the prediction models 160 may not be associated with a penalty. In some such cases, a prediction model may be selected from a plurality of prediction models based on the accuracy of the output generated by the prediction model or may be selected at random.

Overview of Computing System

Figure 6:
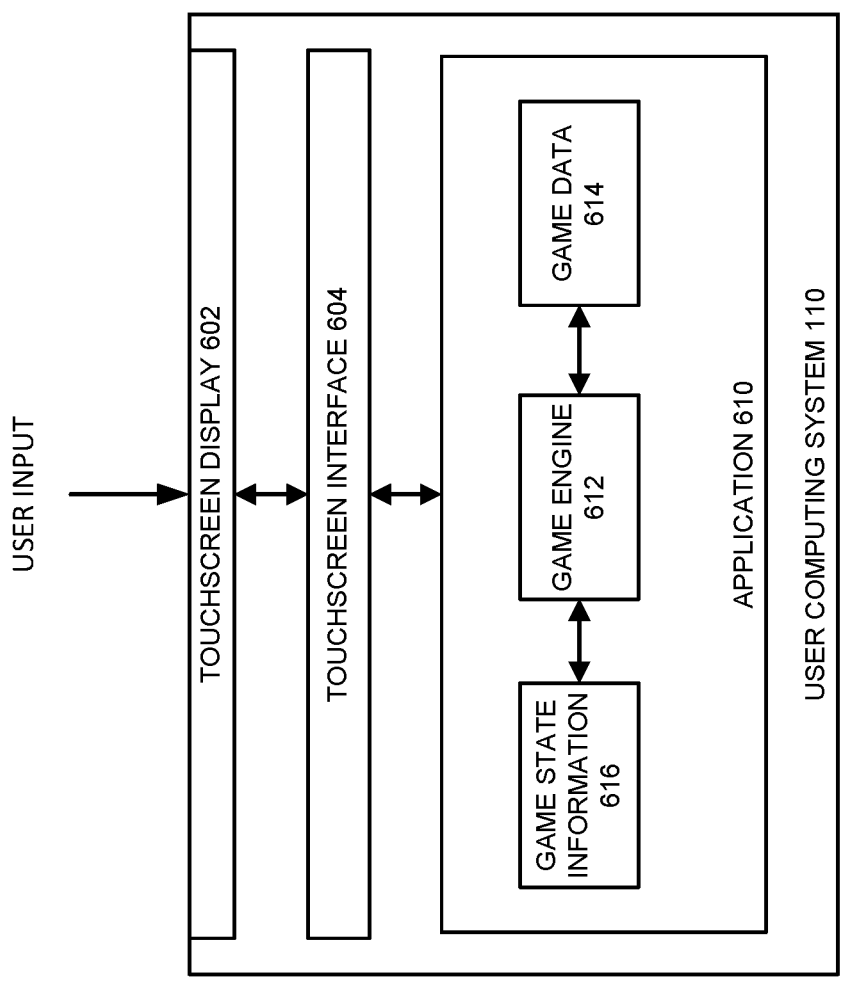
FIG. 6 illustrates an embodiment of a user computing system.

FIG. 6 illustrates an embodiment of a user computing system 110, which in some cases may also be referred to as a gaming system. In some embodiments, the user computing system 110 is a game developer system. In other embodiments, the user computing system 110 may be unrelated to video games. In such embodiments, portions of the user computing system 110 relating to video games and described in more detail below may be omitted. As illustrated, the user computing system 110 may be a single computing device that can include a number of elements. However, in some cases, the user computing system 110 may include multiple devices. For example, the user computing system 110 may include one device that includes a central processing unit and a graphics processing unit, another device that includes a display, and another device that includes an input mechanism, such as a keyboard or mouse.

The user computing system 110 can be an embodiment of a computing system that can execute a game system. In the non-limiting example of FIG. 6, the user computing system 110 is a touch-capable computing device capable of receiving input from a user via a touchscreen display 602. However, the user computing system 110 is not limited as such and may include non-touch capable embodiments, which do not include a touchscreen display 602.

The user computing system 110 includes a touchscreen display 602 and a touchscreen interface 604, and is configured to execute a game application 610. Although described as a game application 610, in some embodiments the application 610 may be another type of application, such as an application capable of making a job request to the job management system 101. While user computing system 110 includes the touchscreen display 602, it is recognized that a variety of input devices may be used in addition to or in place of the touchscreen display 602.

The user computing system 110 can include one or more processors, such as central processing units (CPUs), graphics processing units (GPUs), and accelerated processing units (APUs). Further, the user computing system 110 may include one or more data storage elements. In addition, the user computing system 110 may include one or more volatile memory elements, such as random-access memory (RAM). In some embodiments, the user computing system 110 can be a specialized computing device created for the purpose of executing game applications 112. In some embodiments, the user computing system 110 may be a general purpose computing system. For example, the user computing system 110 may be a laptop with an integrated touchscreen display or desktop computer with an external touchscreen display. Components of an example embodiment of a user computing system 110 are described in more detail with respect to FIG. 7.

The touchscreen display 602 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 602. The touchscreen interface 604 can be configured to translate the touch input into data and output the data such that it can be interpreted by components of the user computing system 110, such as an operating system and the application 610. The touchscreen interface 604 can translate characteristics of the tactile touch input touch into touch input data. Some example characteristics of a touch input can include, shape, size, pressure, location, direction, momentum, duration, and/or other characteristics. The touchscreen interface 604 can be configured to determine the type of touch input, such as, for example a tap (for example, touch and release at a single location) or a swipe (for example, movement through a plurality of locations on touchscreen in a single touch input). The touchscreen interface 604 can be configured to detect and output touch input data associated with multiple touch inputs occurring simultaneously or substantially in parallel. In some cases, the simultaneous touch inputs may include instances where a user maintains a first touch on the touchscreen display 602 while subsequently performing a second touch on the touchscreen display 602. The touchscreen interface 604 can be configured to detect movement of the touch inputs. The touch input data can be transmitted to components of the user computing system 110 for processing. For example, the touch input data can be transmitted directly to the application 610 for processing.

In some embodiments, the touch input data can undergo processing and/or filtering by the touchscreen interface 604, an operating system, or other components prior to being output to the application 610. As one example, raw touch input data can be captured from a touch input. The raw data can be filtered to remove background noise, pressure values associated with the input can be measured, and location coordinates associated with the touch input can be calculated. The type of touch input data provided to the application 610 can be dependent upon the specific implementation of the touchscreen interface 604 and the particular API associated with the touchscreen interface 604. In some embodiments, the touch input data can include location coordinates of the touch input. The touch signal data can be output at a defined frequency. Processing the touch inputs can be computed many times per second and the touch input data can be output to the game application for further processing.

The touchscreen interface 604 or another component of the user computing system 110, such as the operating system, can provide user input, such as touch inputs, to the game application 112. In some embodiments, the user computing system 110 may include alternative or additional user input devices, such as a mouse, a keyboard, a camera, a game controller, and the like. Further, the user computing system 110 may include a virtual reality display and/or an augmented reality display.

A user can interact with the game application 610 via the touchscreen interface 604 and/or one or more of the alternative or additional user input devices. The game engine 612 can be configured to execute aspects of the operation of the game application 112 within the user computing system 110. Execution of aspects of gameplay within a game application can be based, at least in part, on the user input received, the game data 614, and game state information 616. The game data 614 can include game rules, prerecorded motion capture poses/paths, environmental settings, constraints, animation reference curves, skeleton models, and/or other game application information. Further, the game data 614 may include information that is used to set or adjust the difficulty of the game application 610.

Example Hardware Configuration of Computing System

Figure 7:
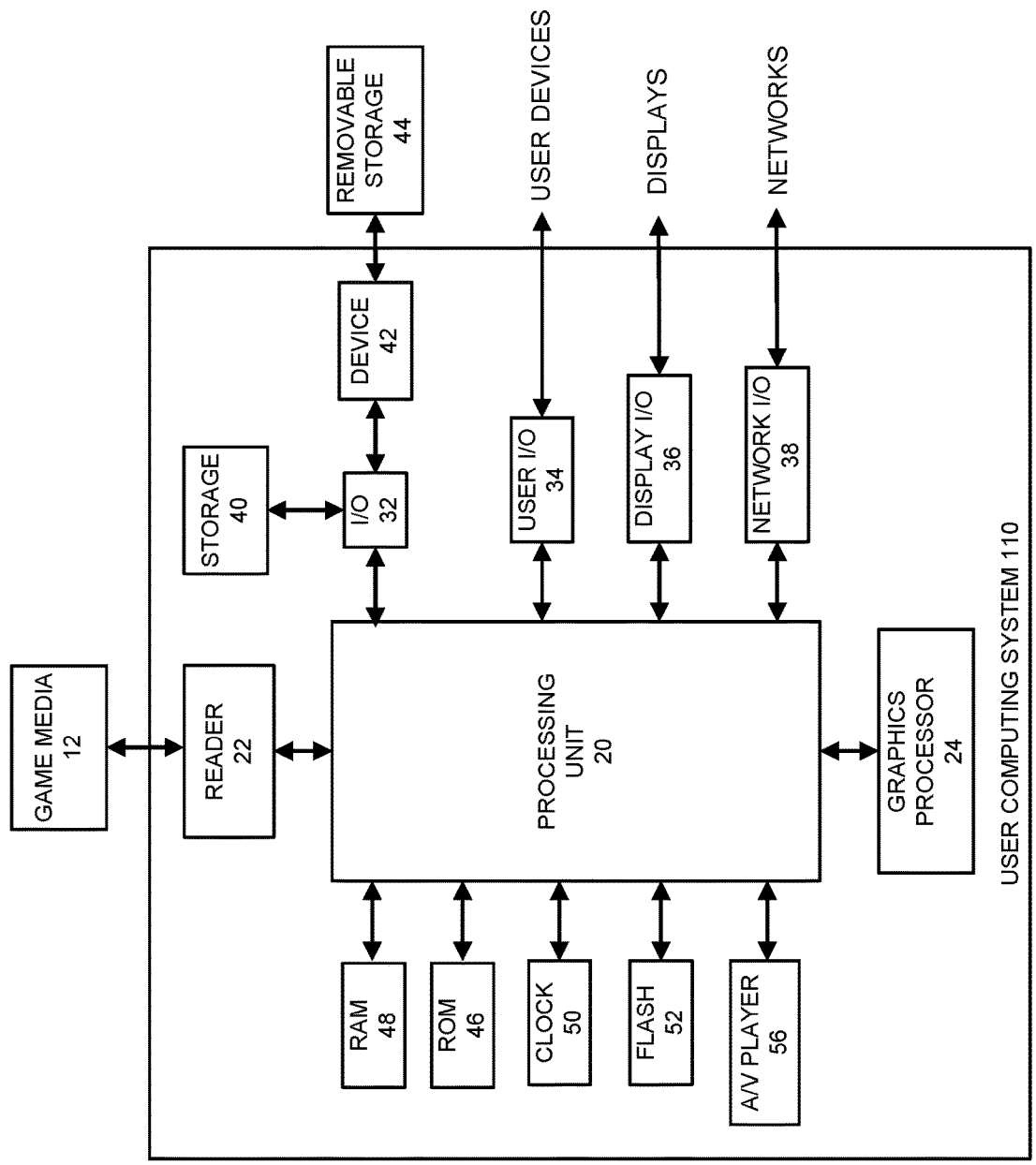
FIG. 7 illustrates an embodiment of a hardware configuration for the user computing system of FIG. 6.

FIG. 7 illustrates an embodiment of a hardware configuration for the user computing system 110 of FIG. 6. Other variations of the user computing system 110 may be substituted for the examples explicitly presented herein, such as removing or adding components to the user computing system 110. The user computing system 110 may include a dedicated game device, a smart phone, a tablet, a personal computer, a desktop, a laptop, a smart television, a car console display, and the like. Further, (although not explicitly illustrated in FIG. 7) as described with respect to FIG. 6, the user computing system 110 may optionally include a touchscreen display 602 and a touchscreen interface 604.

As shown, the user computing system 110 includes a processing unit 20 that interacts with other components of the user computing system 110 and also components external to the user computing system 110. The user computing system 110 may include a game media reader 22 that can communicate with game media 12. The game media reader 22 may be an optical disc reader capable of reading optical discs, such as CD-ROM or DVDs, or any other type of reader that can receive and read data from game media 12. In some embodiments, the game media reader 22 may be used to read other data stored on a media 12, which may store data other than games. In some embodiments, the game media reader 22 may be optional or omitted. For example, game content or applications may be accessed over a network via the network I/O 38 rendering the game media reader 22 and/or the game media 12 optional.

The user computing system 110 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 110 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 110 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for the user computing system 110. Processing unit 20 can communicate through I/O 32 to store data, such as game state data and any shared data files. In addition to storage 40 and removable storage media 44, the user computing system 110 is also shown including ROM (Read-Only Memory) 46 and RAM 48. RAM 48 may be used for data that is accessed frequently, such as when a game is being played, or for all data that is accessed by the processing unit 20 and/or the graphics processor 24.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online. Alternatively, or in addition, network I/O 38 may be used to communicate job requests to the job management system 101.

Display output signals may be produced by the display I/O 36 and can include signals for displaying visual content produced by the user computing system 110 on a display device, such as graphics, user interfaces, video, and/or other visual content. The user computing system 110 may comprise one or more integrated displays configured to receive display output signals produced by the display I/O 36, which may be output for display to a user. According to some embodiments, display output signals produced by the display I/O 36 may also be output to one or more display devices external to the user computing system 110.

The user computing system 110 can also include other features that may be used with a game, such as a clock 50, flash memory 52, and other components. An audio/video player 56 might also be used to play a video sequence, such as a movie. It should be understood that other components may be provided in the user computing system 110 and that a person skilled in the art will appreciate other variations of the user computing system 110.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user computing system 110 is turned off or loses power.

As user computing system 110 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed:

1. A computer-implemented method comprising:
   as implemented by an interactive computing system configured with specific computer-executable instructions,
   receiving a plurality of job requests, the job requests corresponding to a plurality of jobs to be performed at a plurality of computing clusters comprising one or more network computing systems, each computing cluster located at a different data center, wherein each of the one or more network computing systems provide computing resources that are capable of performing at least one of the plurality of jobs;
   generating a job dependency topology indicating a dependency relationship between two or more jobs of the plurality of jobs;
   determining a predicted computer resource usage to process the plurality of jobs by applying at least the job dependency topology and job metadata associated with the plurality of jobs as inputs to a prediction model, wherein the prediction model predicts computing resource usage to complete sets of jobs, wherein the prediction model is generated based at least in part on historical data relating to previously completed jobs, and wherein the prediction model comprises a set of weighted parameters that are combined to form the prediction model, the set of weighted parameters determined based on the historical data;
   determining a network resource allocation at the plurality of computing clusters based at least in part on the predicted computer resource usage;
   allocating network computing resources at the plurality of computing clusters based at least in part on the network resource allocation determined based at least in part on the predicted computer resource usage; and
   distributing the plurality of jobs to the plurality of computing clusters based at least in part on the job dependency topology and the allocated network computing resources, wherein at least one job is provided to a different computing cluster of the plurality of computing clusters than at least one other job of the plurality of jobs.

2. The computer-implemented method of claim 1, wherein each of a plurality of data centers that host the plurality of computing clusters is associated with a different entity than the interactive computing system, and wherein at least one of the plurality of data centers is associated with a different entity than at least one other of the plurality of data centers.

3. The computer-implemented method of claim 1, wherein the job dependency topology further indicates a dependency relationship between a first portion of a job of the plurality of jobs and a second portion of a job of the plurality of jobs.

4. The computer-implemented method of claim 1, wherein the job dependency topology indicates that at least one job from the plurality of jobs is not dependent on another job from the plurality of jobs.

5. The computer-implemented method of claim 1, wherein the job metadata comprises data relating to at least one of a job type, a job priority level, a job owner that requested the job, or a job due date.

6. The computer-implemented method of claim 1, further comprising generating the prediction model based at least in part on a machine learning algorithm.

7. The computer-implemented method of claim 1, wherein determining the network resource allocation comprises providing the predicted computer resource usage to an objective function that determines the network resource allocation based on an objective.

8. The computer-implemented method of claim 7, wherein the objective comprises one or more of reducing processing time, reducing cost, increasing utilization of available computing resources, or satisfying a service level agreement.

9. The computer-implemented method of claim 1, further comprising updating the job dependency topology based at least in part on the network resource allocation to identify network computing resources assigned to each job within the job dependency topology.

10. The computer-implemented method of claim 1, wherein allocating the network computing resources at the plurality of computing clusters further comprises maintaining an unallocated portion of network computing resources available at the plurality of computing clusters to enable the processing of unscheduled jobs.

11. A system comprising:
an electronic data store system configured to store job dependency topologies; and
a computing task management system comprising one or more hardware processors, the computing task management system configured to execute specific computer-executable instructions to at least:
receive a plurality of job requests, the job requests corresponding to a plurality of jobs to be performed at a plurality of computing clusters comprising one or more network computing systems, each computing cluster located at a different data center, wherein each of the one or more network computing systems provide computing resources that are capable of performing at least one of the plurality of jobs;
generate a job dependency topology indicating a dependency relationship between two or more jobs of the plurality of jobs;
store the job dependency topology at the electronic data store;
determine a predicted computing resource usage to process the plurality of jobs by applying at least the job dependency topology and job metadata associated with the plurality of jobs as input to a prediction model, wherein the prediction model predicts computing resource usage to complete sets of jobs, wherein the prediction model is generated based at least in part on historical data relating to previously completed jobs, and wherein the prediction model comprises a set of weighted parameters that are combined to form the prediction model, the set of weighted parameters determined based on the historical data;
determine a computing resource allocation at the plurality of computing clusters based at least in part on the predicted computing resource usage;
allocate computing resources at the plurality of computing clusters based at least in part on the computing resource allocation determined based at least in part on the predicted computing resource usage; and
distribute the plurality of jobs to the plurality of computing clusters based at least in part on the job dependency topology and the allocated computing resources, wherein at least one job is provided to a different computing cluster of the plurality of computing clusters than at least one other job of the plurality of jobs.

12. The system of claim 11, wherein the dependency relationship between the two or more jobs comprises a dependency between a portion of a first job of the plurality of jobs and a portion of a second job of the plurality of jobs.

13. The system of claim 11, wherein the computing task management system is further configured to generate the prediction model based at least in part on a machine learning algorithm.

14. The system of claim 11, wherein the computing task management system is further configured to execute specific computer-executable instructions to at least determine the computing resource allocation using an objective function configured to maximize computing resource utilization of available computing resources at the plurality of computing clusters.

15. The system of claim 11, wherein the computing task management system is further configured to execute specific computer-executable instructions to at least allocate a subset of the computing resources at the plurality of computing clusters to process one or more unscheduled jobs received separately from the plurality of job requests, and wherein the plurality of job requests comprise scheduled jobs.

16. A non-transitory computer-readable storage medium storing computer executable instructions that, when executed by one or more computing devices, configure the one or more computing devices to perform operations comprising:
receiving a plurality of jobs to be performed at a plurality of computing clusters comprising one or more network computing systems, each computing cluster located at a different data center, wherein each of the one or more network computing systems provide computing resources that are capable of performing at least one of the plurality of jobs;
generating a job dependency topology indicating a dependency relationship between two or more jobs of the plurality of jobs;
determining a predicted computing resource usage to process the plurality of jobs by applying at least the job dependency topology and job metadata associated with the plurality of jobs as input to a prediction model, wherein the prediction model predicts computing resource usage to complete sets of jobs, wherein the prediction model is generated based at least in part on historical data relating to previously completed jobs, and wherein the prediction model comprises a set of weighted parameters that are combined to form the prediction model, the set of weighted parameters determined based on the historical data;

determining a computing resource allocation at the plurality of computing clusters based at least in part on the predicted computing resource usage;

allocating computing resources at the plurality of computing clusters based at least in part on the computing resource allocation determined based at least in part on the predicted computing resource usage; and distributing the plurality of jobs to the plurality of computing clusters based at least in part on the job dependency topology and the allocated computing resources, wherein at least one job is provided to a different computing cluster of the plurality of computing clusters than at least one other job of the plurality of jobs.

17. The non-transitory computer-readable storage medium of claim 16, wherein the job dependency topology further indicates a dependency relationship between a first portion of a job of the plurality of jobs and a second portion of the job of the plurality of jobs.

18. The non-transitory computer-readable storage medium of claim 16, further comprising generating the prediction model based at least in part on an application of historical computing task data to a machine learning algorithm.

19. The non-transitory computer-readable storage medium of claim 16, wherein the operations further comprise redistributing at least some of the plurality of jobs based at least in part on receiving a set of unscheduled jobs.

20. The non-transitory computer-readable storage medium of claim 16, wherein the operations further comprise redistributing at least some of the plurality of jobs based at least in part on a change in availability of computing resources of at least one of the plurality of computing clusters.

* * * * *